Nov. 19, 1940.  D. S. WOLCOTT  2,222,579
WELDED SEAM CLAD TUBING
Filed July 20, 1939
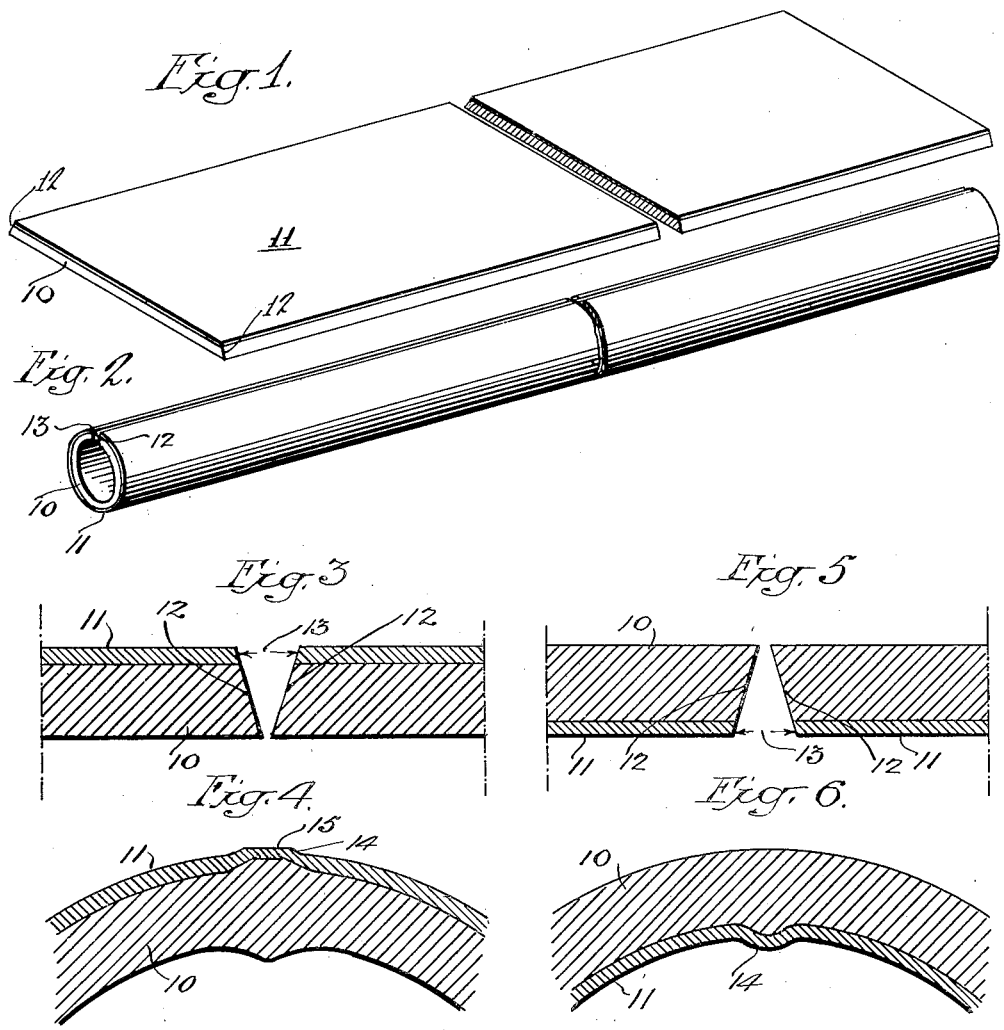
Inventor
Darwin S Wolcott
by his Attorneys
Howson & Howson Patented Nov. 19, 1940

2,222,579

UNITED STATES PATENT OFFICE 2,222,579

WELDED SEAM CLAD TUBING

Darwin S. Wolcott, Colonial Village, Pa., assignor to Lukens Steel Company, Coatesville, Pa., a corporation of Pennsylvania Application July 20, 1939, Serial No. 285,599

6 Claims. (Cl. 219—10)

This invention relates to welded seam clad tubing and, more particularly, to clad tubing of the general type described in my copending application Serial Number 278,985, filed June 13, 1939, for Welded clad tubing, in which I have described a method of producing corrosion-resistant tubes in which the corrosion-resisting metal is applied as a cladding to one surface of a base metal sheet. As pointed out in that application, it has heretofore been customary to manufacture tubing of this class from solid nickel, and while this tubing is highly efficient for the purposes for which it is primarily designed, it has the great disadvantage of being highly expensive. It has also been proposed to manufacture tubing of this class by a process involving the insertion of one of two separately formed tubes within the other, one of said tubes having a relatively thin wall and being composed of nickel and the other being of common steel and having relatively thick walls to confer the necessary body strength. Tubes of this latter type, while effecting an economy in materials over the tubes composed entirely of nickel, are still relatively expensive by reason of the complicated process of manufacture, and they further lack the desirable close attachment or union between the two metals of which the composite tube is formed.

The production of tubing formed entirely of either pure or alloyed metal has been economically carried out either by resistance or flash welding, an apparatus and method for producing such tubing by resistance welding being illustrated in Patent No. 1,388,434, granted August 23, 1921, to G. B. Johnson. Those familiar with these welding methods and the conditions which it is necessary to establish to obtain a satisfactory weld, when approached by the applicant, advised that such methods could not be employed in the production of a clad tubing due to the fact that the cladding and the base metal have different electrical properties, specific heats, coefficients of expansion, melting points, and other physical constants. It was considered that these differences would prevent the formation of a satisfactory weld, or would result in a destruction of the cladding at and adjacent the weld. In flash welding, the difficulties of producing a satisfactory weld are particularly exaggerated where the heavy current produces very high temperatures and the abutting edges are brought to the molten state prior to the application of high pressure. This pressure produces a squeezing or upset at one or both faces of the weld.

In the prior application above identified, I have pointed out methods whereby welded seam tubing clad on one or both faces may be produced by welding methods in which both the tube and its cladding are unitary structures throughout.

An important object of the present invention is to provide an improved method of producing welded seam tubing of this type in which the cost of production may be materially reduced and a completely clad tube manufactured at a much lessened cost.

The manner in which a tube may be produced in accordance with my present invention is illustrated in the accompanying drawing wherein:

Fig. 1 is a sectional view showing a clad sheet for use in producing tubing in accordance with my invention;

Fig. 2 is a view showing the sheet rolled preparatory to the welding operation;

Fig. 3 is a partially diagrammatic view illustrating the method of beveling the sheet for producing an outwardly clad tube;

Fig. 4 is a fragmentary sectional view showing the completed weld on an outwardly clad tube;

Fig. 5 is a view similar to that of Fig. 3 but showing beveling to produce an inwardly clad tube; and Fig. 6 is a fragmentary sectional view through an inwardly clad tube.

Referring now more particularly to the drawing, in accordance with my invention I first produce a composite blank in the general form shown in Fig. 1 of the drawing, the blank consisting of a sheet 10 of base metal, such as common steel, on one side of which a relatively thin sheet 11 of corrosion-resisting material, such as nickel has been adhered. As in the case of the prior application hereinbefore noted, the nickel sheet 11 may be adhered to the body strip by any suitable means which insures a complete union therebetween, but I prefer to employ what is generally known as the cladding process in which the composite sheet is produced by rolling out a composite billet to the desired thickness. The thickness of the composite blank and the relative thickness of the sheets 10 and 11 are unimportant, and may vary as required, but the composite sheet should be made slightly wider than the circumference of the tube into which the sheet is to be formed. The edges of the sheet are beveled as at 12, the beveling being from the outer face of the cladding material to the free face of the backing sheet 10.

In those cases where it is desired to form an exteriorly clad tube, the beveling occurs as shown in Fig. 3, and the sheet when preformed prior to the welding operation is rolled as indicated in Fig. 2. It will be noted that in the formed sheet a considerable gap 13 exists between the adjacent edges of the cladding material which, as heretofore stated, is in the form of a relatively thin sheet. The edges of the tube are then forced together while at the same time an electric welding current is passed therethrough. The welding current heats the opposed edges of the backing sheet 10 to a fusing temperature and this temperature is, of course, transmitted conductively to the thin cladding sheet 11. Substantially all corrosive-resistant materials such as nickel have a much higher electrical heat-resistant characteristic than the usual grade backing materials; that is to say, their resistance to the passage of electrical currents increases rapidly with a rise of temperature as compared to such metals. Accordingly, by the time the welding operation has proceeded to a point where the edges of the cladding sheet 11 come into contact and may fuse, their resistance to the passage of current is such that no flash will occur and the welded joint is completed without the necessity of adding at such joint further metal of the same order. Furthermore, the beveling prevents extrusion of the backing metal into that portion of the weld comprising the cladding sheet. While there is a slight tendency of the two metals to alloy at the bond, this tendency is not sufficiently great to cause any real interference with the corrosion-resistant properties of the cladding sheet.

When it is desired to form an interiorly clad tube the curvature of the sheet is reversed, as indicated in Fig. 5. While a slight hump forms, as indicated at 14, at the clad surface during completion of the weld this hump is not so accentuated that it cannot be reduced if desired by grinding, rolling or the like, as indicated at 15 in Fig. 4, to a point where it becomes innocuous without destroying the continuity of the clad surface.

Leaving out of consideration the cost of the sheet 11 and of producing the same, the actual cost of producing a tube after the method hereinbefore set forth is but slightly greater than that of producing a tube of solid material and, accordingly, the cost of producing clad tubes is by my method much less than that of producing them by methods heretofore utilized. The angle at which the sheet should be beveled at 12 must, of course, be determined by the characteristics of the backing and cladding sheets, the diameter of the tube to be formed, and by the conditions under which the weld is formed.

I claim:

1. In the production of nickel-clad tubing, the method comprising producing a unitarily bonded strip consisting of a ferrous base sheet and a thin nickel cladding engaging one face only of the base sheet, shaping the strip in the general form of a tube in a manner such that the edges of the base sheet first come in contact, heating the edges of the tube by passing an electrical current through the contacting edges thereof while forcing said edges together to progressively form first a weld of the ferrous material and finally a weld of the nickel cladding and stopping the welding operation upon formation and prior to substantial deformation of the weld of the nickel cladding or extrusion of the base sheet through the welded cladding.

2. In the production of nickel-clad tubing, the method comprising producing a unitarily bonded strip consisting of a ferrous base sheet and a thin nickel cladding engaging one face only of the base sheet, beveling at least one of the edges of the strip so that the base sheet projects beyond the cladding material, shaping the strip in the general form of a tube in a manner such that the edges of the base sheet first come in contact, heating the edges of the tube by passing an electrical current therethrough while forcing said edges together to progressively form first a weld of the ferrous base sheet and finally a weld of the nickel cladding and stopping the welding operation upon formation and prior to substantial deformation of the weld of the nickel cladding or extrusion of the base sheet through the welded cladding.

3. In the production of welded seam tubing comprising a tubular ferrous body exteriorly clad with a corrosion-resistant metal, the method comprising producing a unitarily bonded strip consisting of a sheet of the body material and a relatively thin sheet of a corrosion-resistant cladding material engaging one face only of the body sheet, shaping the strip in the general form of a tube in a manner such that the cladding material is exteriorly disposed and the edges of the body material first come in contact, heating the edges of the tube by passing an electrical current through the meeting edges thereof while forcing said edges together to progressively form first the weld of the body material and finally a weld of the cladding material and stopping the welding operation upon formation and prior to substantial deformation of the weld of the cladding material or extrusion of the body material through the welded cladding.

4. In the production of welded seam tubing comprising a tubular ferrous body clad on a face thereof with a corrosion-resistant metal, the method comprising producing a unitarily bonded strip consisting of a sheet of the body material and a relatively thin sheet of a corrosion-resistant cladding material, beveling at least one of the edges of the strip so that the body material projects beyond the cladding material, shaping the strip in the general form of a tube in a manner such that the edges of the body material remote from that face thereof bearing the cladding material first come into contact, heating the edges of the tube by passing an electrical current therethrough while forcing said edges together to progressively form first a weld of the body material and finally a weld of the cladding material and stopping the welding operation upon formation of and prior to substantial deformation of the weld of the cladding material or extrusion of the body material through the welded cladding.

5. In the production of welded seam tubing consisting of a tubular ferrous body clad on a face thereof with a corrosion-resistant metal, the method comprising producing a unitarily bonded strip consisting of a sheet of the body material and a relatively thin sheet of a corrosion-resistant cladding material engaging one face only of the body, shaping the strip in the general form of a tube in a manner such that the edges of the body material first come in contact, electrically heating the edges of the tube by passing an electrical current therethrough while forcing said edges together to progressively form first a weld of the body material and finally a weld of the cladding material, and stopping the welding operation upon formation of and prior to substantial deformation of the weld of the cladding material or extrusion of the body material through the welded cladding.

6. In the production of welded seam tubing comprising a tubular ferrous body interiorly clad with a corrosion-resistant metal, the method comprising producing a unitarily bonded strip consisting of a sheet of the body material and a relatively thin sheet of a corrosion-resistant cladding material engaging one face only of the body, shaping the strip in the general form of a tube in a manner such that the cladding material is interiorly disposed and the edges of the body first come in contact, heating the edges of the tube by passing an electrical current therethrough while forcing said edges together to progressively form first the weld of the body material and finally a weld of the cladding material and stopping the welding operation upon formation and prior to substantial deformation of the weld of the cladding material or extrusion of the body material through the welded cladding.

DARWIN S. WOLCOTT.